3,511,896
GRAFT COPOLYMER COMPOSITIONS OF VINYL CHLORIDE POLYMERS AND STYRENE HAVING IMPROVED IMPACT STRENGTH AND METHOD
David E. Harmer, Midland, Mich., assignor to The Dow Chemical Company, Midland, Mich., a corporation of Delaware
No Drawing. Filed Sept. 28, 1966, Ser. No. 582,505
Int. Cl. C08f *19/02, 19/08*
U.S. Cl. 260—876                    4 Claims

ABSTRACT OF THE DISCLOSURE

Compositions of matter consisting of vinyl chloride polymers, styrene and ABS polymers and a method of making the same which comprises blending said ingredients into a uniform mass of materials having a desired shape and subjecting said shaped material to ionizing radiation.

---

This invention relates to vinyl chloride graft copolymer compositions of improved impact strength, and to a method of making them. More specifically, this invention relates to vinyl chloride polymers which are uniformly mixed first with styrene, then with an acrylonitrile-butadiene-styrene (hereinafter referred to as ABS) copolymer composition and the entire mixture cured by radiation. This sequence of mixing greatly and unexpectedly improves the impact strength of the final cured product.

Vinyl chloride polymer compositions of certain improved physical properties are described in copending application Ser. No. 567,108, filed July 22, 1966, which is a continuation-in-part of application Ser. No. 209,831, filed July 16, 1962, now abandoned. As described therein vinyl chloride polymer compositions that can be processed readily and efficiently into rigid high strength fabricated products with conventional fabricating techniques are provided by a composition consisting essentially of a mixture of from 70 to 95, and preferably from 85 to 92, weight percent, based on the weight of the composition, of a vinyl chloride polymer having at least about 50, and preferably at least about 85, weight percent polymerized vinyl chloride in the polymer molecule, and from 30 to 5, and preferably from 15 to 8, weight percent based on the weight of the composition of styrene. The aforementioned applications teach the fabrication of articles by mixing vinyl chloride polymer with styrene to produce a particulated, free-flowing, moldable mixture, then fabricating or molding into the desired form-stable article. The form-stable article prepared in this manner is then cured to a rigid, solid form by exposure to high energy ionizing radiation to obtain improved physical properties. However, in certain applications, it is desirable that such compositions possess improved impact strength as in electrical appliances such as grills for air conditioners, television and radio cabinets, etc., which are frequently subjected to impact and mechanical shock.

Accordingly, it is the primary concern and principal object of this invention to provide vinyl chloride graft copolymer compositions which can be effectively and efficiently processed with conventional fabricating techniques into fabricated articles having exceptionally improved impact strength.

A further object of the invention is to provide vinyl chloride polymer compositions suitable for producing rigid fabricated, graft copolymeric products of improved impact strength.

An additional object of the invention is to provide a method for producing rigid, solid, fabricated, graft copolymeric products of improved impact strength from the vinyl chloride polymer compositions of the invention.

It is known that certain ABS-type copolymers have a rubberizing effect which improves the impact resistance of certain polymers. To be effective they must be thoroughly blended with the parent material, usually being added to a molding formulation at the last step before final fabrication.

I have discovered that when a certain amount of an ABS copolymer is mixed or blended with a mixture consisting essentially of a vinyl chloride polymer and graft polymerizable styrene monomer prior to the radiation curing step, the impact strength of the cured graft copolymer composition is substantially and unexpectedly improved. In contrast, when the same ABS copolymer is added to the vinyl chloride polymer-styrene graft copolymer composition after the radiation curing step and before final fabrication, a material having inferior impact strength is obtained.

In accordance with the present invention, modified vinyl chloride polymer compositions that can readily and efficiently be processed into rigid shaped or molded products having unusually high impact strength with conventional fabricating techniques are provided by a composition consisting essentially of a mixture of: from about 57 to 94 weight percent, based on the weight of the composition, of a vinyl chloride polymer having at least about 50 weight percent polymerized vinyl chloride in the polymer; from about 29 to 4 weight percent, based on the weight of the composition, of styrene; and up to about 18 weight percent, and preferably from about 8 to 15 weight percent, based on the weight of the composition, of a copolymer composition consisting esentially of polymerized acrylonitrile, butadiene, and styrene.

The compositions of this invention are especially outstanding in that they can be readily and easily fabricated into form-stable, shaped articles before curing because the modified polymer-monomer composition, to which an ABS copolymer modifier has been added, remains in a substantially free-flowing, moldable, particulate state. Subsequently as desired, said shapde articles can be cured easily and without the need to resort to the application of severe mechanical force as is necessary in some other curing processes. The cured articles are rigid, solid, substantially non-crosslinked or thermoplastic graft copolymeric shaped articles which can be dissolved because essentially no chemical bonds exist between the polymer chains, and which can be easily subjected to a secondary fabrication step following said cure.

Surprising as it may seem, the use of an ABS copolymer composition in the proportions herein prescribed for the formation of the modified vinyl chloride polymer compositions provides uniquely superior and entirely unpredictable results. Thus, by preparation and fabrication of the mixtures of the invention, products of unexpectedly and significantly superior impact resistance are obtained.

The copolymer compositions useful in the practice of this invention are the ABS type polymers similar to those described in U.S. Pat. 3,238,275 which polymers contain in chemically combined form from about 30 to 75 percent by weight of styrene, from about 5 to 20 percent by weight of acrylonitrile, and from about 20 to 60 percent by weight of a rubbery polymer of butadiene such as polybutadiene or a rubbery copolymer of butadiene and styrene.

It is ordinarily preferable to utilize normally solid ABS copolymeric modifiers in carrying out the present invention. In this connection, copolymeric material in powder or similar particulate form which readily lends itself to mixing and blending techniques is desirable.

In the practice of the present invention, monomeric styrene is mixed with a particulated, free-flowing vinyl chloride polymer, the monomer being essentially absorbed or imbibed by the polymer at ambient temperatures leaving a particulated, free-flowing, moldable mixture. Thereafter, an ABS modifier is mixed or blended with the polymer-monomer mixture leaving a substantially particulated, free-flowing, moldable mixture.

In an alternative procedure, the aforementioned sequence of mixing need not be strictly followed in order to produce the compositions of the present invention. However, for ease of mixing, it is preferable to follow said sequence.

The quantity of ABS copolymer modifier that is blended or mixed with the polymer-monomer mixture to produce the compositions of the invention may not only depend on the specific nature and characteristics of said mixture that is intended to be modified, but also on the particular fabrication process to which the polymer-monomer-modifier composition is to be subjected.

Advantageously, compositions of the invention contain up to about 18 weight percent, based on composition weight, of an ABS copolymer composition. Beneficially, and preferably, from about 8 to 15 weight percent of an ABS copolymeric modifier is employed in the present compositions.

Accordingly, from about 57 to 94 weight percent of the vinyl chloride polymer, and from about 29 to 4 weight percent of styrene, each based on composition weight, are employed in the composition of the invention.

The vinyl chloride polymer that is employed in the practice of the invention is beneficially polyvinyl chloride. Or, a copolymer having at least about 50 weight percent and advantageously at least about 85 weight percent polymerized vinyl chloride in the polymer molecule with any remainder being another monoethylenically unsaturated monomer copolymerized in the polymer molecule with the vinyl chloride can be advantageously utilized. Thus, copolymers of vinyl chloride with vinyl acetate, vinyl propionate, methyl acrylate, ethyl acrylate, butyl acrylate, methyl methacrylate, ethyl methacrylate, acrylonitrile, vinylidene chloride and various maleate esters typified by dibutyl maleate and the like may be employed.

In some instances, it may be desirable, although not necessary, to include a heat stabilizer in the compositions to diminish or eliminate any adverse discoloration of the product fabricated therefrom during the fabrication. In this regard, any of the conventional heat stabilizers for vinyl chloride polymers can be used including dibutyl tin laurate, dibutyl tin sulfide, dibutyl tin dimercaptide, or the like.

In addition, it may be desirable to incorporate other materials in the compositions of the invention. In this connection it may be desirable, although not necessary, to include a polymeric molding aid in the composition. Additionally, when the present compositions are to be employed in certain heat fabricating processes, it may be desirable, although not necessary, to include in the composition inhibitors which will prevent or retard to an appreciable extent homopolymerization of the styrene monomer during the heat fabrication of the mixture.

In the preparation of the compositions, it is important that a complete, uniform and intimate mixing of the constituents be accomplished to assure uniformity in the product. Specifically, it is important that the styrene monomer be substantially uniformly absorbed or imbibed by the vinyl chloride polymer, and that the ABS copolymeric modifier be substantially uniformly mixed or blended with the polymer-monomer composition prior to fabrication and curing. Any suitable mixing technique can be utilized that is suited to the purpose. Elevated temperatures can be used to accelerate the mixing operation and in the formation of optimum compositions, but are not necessary.

The mixed or blended compositions of the invention can be fabricated by any of the conventional techniques adapted for the purpose. Thus, they can be conveniently processed into any number of shapes or varying sizes with the use of such techniques as rotational molding, calendering, extrusion, injection and compression molding, etc. Additionally, they can be advantageously and beneficially employed for producing high strength reinforced plastics with glass mat, cloth and the like.

The curing of the fabricated compositions (in some cases partial curing may occur during the fabrication, particularly if heat fabrication is employed) essentially amounts to a polymerization of the styrene therein. This polymerization proceeds primarily as a graft polymerization of the styrene onto the vinyl chloride polymer backbone, and secondarily as a graft polymerization of the styrene onto the ABS copolymer composition. It is important that an essentially complete cure or conversion of the styrene to polymer be accomplished for optimum utility and physical properties in the resulting fabricated and curtd products.

The polymerization or cure is accomplished and facilitated with the assistance of a catalyzing influence, to propagate graft polymerization, of a field of high energy ionizing radiation.

The polymer-monomer-ABS modifier mixture of the present invention which is fabricated into a shaped article is form-stable at radiation curing temperatures, which can be room temperature.

The high energy ionizing radiation of the type contemplated as being ustful in the practice of the present invention is capable of penetrating 0.1 mm. of aluminum or similar density material. Thus, although ultraviolet light is stopped at the surface of such a barrier, beta and gamma rays are easily capable of penetrating said barrier and are conveniently available from radioactive sources such as various radioactive forms of elements including cobalt-60 and cesium-137, nuclear fission products and the like. It is beneficial to employ the high energy radiation in a field of from about 50,000 rads (50 kilorads) to about 100,000 rads (100 kilorads) per hour intensity. A rad is defined as 100 ergs of energy absorbed per gram of irradiated material. However, intensities down to about 1 to 10 kilorads per hour and up to about 500 kilorads per hour and higher may be advantageously employed.

The following examples serve to illustrate my invention. It is to be understood, however, that my invention is not to be limited in scope by these examples.

EXAMPLE I

A composition in accordance with the invention was prepared by weighing out 720 grams of polyvinyl chloride (PVC) powder and placing it in the porcelain jar of a ball mill. 80 grams of styrene monomer, in which had been dissolved 7.2 grams of dibutyl tin dimercaptide as a heat stabilizer and 0.036 gram of tertiary butyl catechol as a polymerization inhibitor, were poured into the PVC powder and the total ingredients were thoroughly mixed by rotating the ball mill overnight to produce a particulated, free-flowing, moldable mixture.

To this blended material were then added 87.8 grams of an ABS impact modifier (a copolymer of acrylonitrile, poly(butadiene-1,3), and styrene in a weight ratio of about 16:about 41:about 43 respectively as shown by infra red analysis) and 4.95 grams of Plaskon Grade 6A polyethylene, a low density polyethylene molding aid.

The ball mill was then rotated for seven hours to complete the blending operation.

The composition contained the following ingredients based on the weight of the composition:

| | Percent |
|---|---|
| Polyvinyl chloride (PVC) | 80 |
| ABS modifier | 9.76 |
| Polyethylene molding aid | 0.55 |
| Styrene | 8.89 |
| Dibutyl tin dimercaptide | 0.8 |
| Tertiary butyl catechol | Trace |

(PVC and styrene are present in a 90 : 10 ratio with respect to each other.)

The mixed compositions were then injection molded at 390° F. into form-stable testing bars having shapes as prescribed by such tests as ASTM D256–56. The molded test bars were removed from the molds, placed in suitable glass tubes and stored in a deep freeze before being irradiated.

The molded bars were subsequently irradiated while in the glass tubes by exposing them to a cobalt-60 source, and cured to form rigid, solid, non-crosslinked, impact-modified, graft-copolymeric articles. Curing was effected with a radiation dose rate of 100 kilorads per hour until a total dose of 1.28 megarads had been received by the test bars.

Subsequent to the irradiation treatment, the test samples, while still in the glass tubes, were heated in a preheated oven at 75° C. for ten minutes to assure an essentially complete cure of the composition, i.e., polymerization of the styrene.

The following tests were used in determining the physical properties of the samples:

| Name of test: | Identification |
|---|---|
| Izod impact | ASTM D256–56 |
| Tensile strength | ASTM D638–61 |
| Percent elongation | ASTM D638–61 |
| Heat distortion | Vicat method |

The results are comparatively portrayed in Table I below which shows unexpectedly and significantly improved impact strength of the composition in accordance with the invention.

EXAMPLE 2

Comparative: Preparation of samples to which the ABS modifier was added following radiation curing 45,359 grams of polyvinyl chloride powder was placed in a 55-gallon drum. To this was added a mixture of 453.6 grams of dibutyl tin dimercaptide, 2.52 grams of tertiary butyl catechol and 5,035 grams of styrene monomer. The weight ratio of PVC to styrene was 90:10. This polymer-monomer mixture was blended by tumbling the drum overnight to produce a particulated, free-flowing, moldable mixture.

A portion of this large batch was extruded into a sheet 11 inches wide and 99 mils thick. The sheet was then radiation cured according to the same procedure as in Example 1 to form a rigid, solid, non-crosslinked graft copolymeric sheet. Thereafter, this sheet was ground to a fine powder by passing it through a Wiley mill using a screen having an opening of 2 mm. diameter.

A portion of this ground, cured, PVC-styrene graft copolymer weighing 240 grams was then mixed with 26.2 grams of the ABS impact modifier, used in Example 1, and 1.5 grams of the low density polyethylene molding aid, Plaskon Grade 6A polyethylene. Blending was effected by rolling for 2 hours in the ball mill. The final composition contained the same percent of ingredients as in Example 1.

The cured, blended composition was molded into testing bars in the same manner as in Example 1 with the exception that much higher temperatures were required and molding was very difficult in comparison.

The same tests as in Example 1 were used to determine the physical properties of the samples. The results are comparatively portrayed in Table I below.

EXAMPLE 3

Comparative: Preparation of samples to which no ABS modifier was added

Another portion of the large batch of polymer-monomer mixture blended in Example 2 (the weight ratio of PVC to styrene was 90:10) was molded, cured and tested according to the same procedure as in Example 1 except for using a larger injection molding machine and excluding the addition of any ABS modifier. The results of tests of these samples are portrayed in Table I below:

TABLE I

| Polymer treatment | Impact strength, izod, ft.-lb./ in. of notch | Tensile strength, p.s.i. | | Percent elongation | Heat distortion temp., ° F., vicat method |
|---|---|---|---|---|---|
| | | Yield | Rupture | | |
| Irradiated after blending in ABS modifier (Example 1) | 1.05 | 6,455 | 5,700 | 56 | 191 |
| ABS modifier blended in after irradiation (Example 2) | 0.67 | | 5,493 | 1 | 178 |
| No ABS modifier blended in (Example 3) | 0.5 | 7,800 | 6,300 | 22 | 191 |

EXAMPLE 4

Samples according to the invention were prepared and tested according to the procedure followed in Example 1 except that the composition was extruded into testing bars and contained:

| | Percent by weight |
|---|---|
| Polyvinyl chloride | 78.69 |
| ABS modifier | 8.74 |
| Polyethylene molding aid | 0.55 |
| Styrene | 10.93 |
| Dibutyl tin dimercaptide | 1.09 |
| Tertiary butyl catechol | Trace |

The izod impact strength of these samples was 1.61 ft.-lbs./in. of notch.

EXAMPLE 5

Samples according to the invention were prepared and tested according to the procedure followed in Example 1 except that the composition was extruded into testing bars and contained:

| | Percent by weight |
|---|---|
| Polyvinyl chloride | 72.35 |
| ABS modifier | 14.47 |
| Polyethylene molding aid | 0.52 |
| Styrene | 10.85 |
| Dibutyl tin dimercaptide | 1.81 |
| Tertiary butyl catechol | Trace |

The izod impact strength of these samples was 1.77 ft.-lbs./in. of notch.

Thus, it is shown that a 50 to 100 percent or more increase in impact strength results when an ABS impact modifier is added to compositions according to the invention, contrasted to when it is added after curing the polymer-monomer mixture or when no ABS modifier is added at all.

I claim:

1. In a method for preparing solid fabricated articles of vinyl chloride polymers by (1) blending together to produce a particulated, free-flowing, moldable mixture consisting of
   (a) from 70 to 95 weight percent, based on the weight of the blend, of a polymer of monoethylenically unsaturated monomeric material containing at least about 50 weight percent of polymerized vinyl chloride and
   (b) from 30 to 5 weight percent, based on the weight of the blend, of styrene monomer;
(2) subjecting said mixed blend consisting of (a) and (b) to a fabrication step to produce a form-stable fabricated article thereof; and
(3) substquently polymerizing by means of ionizing radiation said styrene in said fabricated article of step (2) to form a rigid, solid, fabricated graft copolymeric article;
   the improvement which comprises prior to step (2) mixing with (a) and (b) from 8 to 15 weight percent based on the total weight of the resultant composition, of a copolymer of from about 20 to 60 percent by weight of a rubbery butadiene polymer, from about 5 to 20 percent by weight of acrylonitrile, and from about 30 to 75 percent by weight of styrene.

2. The method of claim 1, wherein said vinyl chloride polymer of (a) is polyvinyl chloride.

3. A vinyl chloride polymer composition consisting essentially of an interpolymerized mixture of
   (a) from about 57 to 94 weight percent, based on the weight of the composition, of a polymer of a monoethylenically unsaturated monomeric material containing at least about 50 weight percent of polymerized vinyl chloride;
   (b) from about 29 to 4 weight percent, based on the weight of the composition, of styrene. and
   (c) from 8 to 15 weight percent, based on the weight of the composition, of a copolymer of from about 20 to 60 percent by weight of a rubbery butadiene polymer, from about 5 to 20 percent by weight of acrylonitrile, and from about 30 to 75 percent by weight of styrene.

4. The composition of claim 3, wherein said vinyl chloride polymer of (a) is polyvinyl chloride.

References Cited

UNITED STATES PATENTS

| | | | |
|---|---|---|---|
| 2,802,809 | 8/1957 | Hayes | 260—876 |
| 3,275,714 | 9/1966 | Thompson | 260—876 XR |
| 3,359,193 | 12/1967 | Pinner | 204—159.17 |

OTHER REFERENCES

Basdekis: ABS Plastics, publ. by Reinhold, November 1964, p. 44 relied upon.

GEORGE F. LESMES, Primary Examiner

U.S. Cl. X.R.

161—204; 204—159.16, 159.17; 260—880, 884; 264—22, 236